United States Patent
Hu et al.

[19]
[11] Patent Number: 6,044,644
[45] Date of Patent: *Apr. 4, 2000

[54] CLOSE COUPLED CATALYST

[75] Inventors: Zhicheng Hu, Edison; Ronald M. Heck, Frenchtown; Harold N. Rabinowitz, Upper Montclair, all of N.J.

[73] Assignee: Engelhard Corporation, Iselin, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/350,297

[22] Filed: Dec. 6, 1994

[51] Int. Cl.$^7$ ............................. F01N 3/20; F01N 3/24
[52] U.S. Cl. .......................... 60/302; 60/299; 423/213.5; 423/213.7
[58] Field of Search .............................. 423/213.7, 213.5; 60/299, 302

[56] References Cited

U.S. PATENT DOCUMENTS

| | | | |
|---|---|---|---|
| 3,540,838 | 11/1970 | Reitmeier | 423/213.5 |
| 3,896,616 | 7/1975 | Keith et al. | 60/274 |
| 3,956,188 | 5/1976 | Hindin et al. | 252/465 |
| 4,021,185 | 5/1977 | Hindin et al. | 431/7 |
| 4,087,384 | 5/1978 | Davis | 423/213.5 |
| 4,134,860 | 1/1979 | Hinden et al. | 252/466 |
| 4,171,288 | 10/1979 | Keith et al. | 252/462 |
| 4,189,404 | 2/1980 | Keith et al. | 252/462 |
| 4,374,103 | 2/1983 | Gandhi et al. | 423/213.5 |
| 4,438,219 | 3/1984 | Brandenburg et al. | 502/333 |

(List continued on next page.)

FOREIGN PATENT DOCUMENTS

| | | | |
|---|---|---|---|
| 615721 | 2/1989 | Australia . | |
| 0 387 611 | 9/1990 | European Pat. Off. . | |
| 0 399 892 | 11/1990 | European Pat. Off. . | |
| 0 460 542 A2 | 12/1991 | European Pat. Off. | F01N 3/20 |
| 0 613 714 A2 | 9/1994 | European Pat. Off. | B01D 53/36 |
| 2 328 512 | 5/1977 | France | B01J 23/86 |
| 7153887 | 4/1987 | Japan . | |
| 63-077544 | 4/1988 | Japan . | |
| 01210032 | 8/1989 | Japan . | |
| 6-226097 | 8/1994 | Japan | 502/302 |
| 79110185 | 5/1979 | Taiwan . | |
| 80214653 | 11/1980 | Taiwan . | |
| 80104517 | 6/1991 | Taiwan . | |
| WO 96/17671 | 6/1996 | WIPO | B01D 53/94 |

OTHER PUBLICATIONS

Low–Emission Vehicle and Zero–Emission Vehicle Program Review, Staff Report, State of California, California Environmental Protection Agency, Air Resources Board, Nov. 1996.

Draft Discussion Paper for the Low–Emission Vehicle and Zero–Emission Vehicle Workshop on Mar. 25, 1994, Low–Emission Vehicle Program Costs, State of California, California Environmental Protection Agency, Air Resources Board.

Clean Air, Technology News, Summer 1994, Institute of Clear Air Companies, Manufacturers of Emission Controls Association.

(List continued on next page.)

*Primary Examiner*—Steven P. Griffin
*Assistant Examiner*—Peter DiMauro
*Attorney, Agent, or Firm*—Richard A. Negin

[57] ABSTRACT

A stable, close-coupled catalyst, an article comprising the close-coupled catalyst and a related method of operation. The close-coupled catalyst comprises a catalyst support and a palladium catalytic component. Preferably and optionally, there are stabilizers including alkaline metal oxide, and rare earth metal components selected from the neodymium and lanthanum components. The close-coupled catalyst composition includes substantially no additional oxygen storage component such as praseodymium or cerium compounds. There is preferably a catalyst such as a three-way catalyst downstream of the close-coupled catalyst. The downstream catalyst preferably includes an oxygen storage component such as cerium oxide or praseodymium oxide.

31 Claims, 2 Drawing Sheets

U.S. PATENT DOCUMENTS

| | | | |
|---|---|---|---|
| 4,448,756 | 5/1984 | Hammerle | 423/213.5 |
| 4,476,246 | 10/1984 | Kim et al. | 502/304 |
| 4,504,598 | 3/1985 | Ono et al. | 502/303 |
| 4,587,231 | 5/1986 | Sawamura et al. | 502/304 |
| 4,591,578 | 5/1986 | Foley et al. | 502/185 |
| 4,591,580 | 5/1986 | Kim et al. | 502/303 |
| 4,624,940 | 11/1986 | Wan et al. | 502/251 |
| 4,708,946 | 11/1987 | Ohata et al. | 502/304 |
| 4,714,694 | 12/1987 | Wan et al. | 502/304 |
| 4,727,052 | 2/1988 | Wan et al. | 502/327 |
| 4,780,447 | 10/1988 | Kim et al. | 502/243 |
| 4,808,564 | 2/1989 | Matsumoto et al. | 502/303 |
| 4,916,898 | 4/1990 | Gandhi et al. | 60/274 |
| 4,923,842 | 5/1990 | Summers | 502/261 |
| 4,965,243 | 10/1990 | Yamada et al. | 502/304 |
| 5,057,483 | 10/1991 | Wan | 502/304 |
| 5,083,427 | 1/1992 | Anderson | 60/274 |
| 5,106,588 | 4/1992 | Sims et al. | 422/180 |
| 5,116,800 | 5/1992 | Williamson et al. | 423/213.5 |
| 5,248,650 | 9/1993 | Sekiba et al. | 423/213.5 |
| 5,260,249 | 11/1993 | Shiraishi et al. | 423/213.5 |
| 5,332,554 | 7/1994 | Yasaki et al. | 60/299 |
| 5,510,086 | 4/1996 | Hemingway et al. | 60/297 |
| 5,597,771 | 1/1997 | Hu et al. | 502/304 |

OTHER PUBLICATIONS

Catalytic Air Pollution Control, Commercial Technology by R.M. Heck and R.J. Farrauto, Engelhard Corporation Research & Development, Van Nostrand Reinhold Publishers, pp. 73–111, 1995.

SAE 960797 Study of Divided Converter Catalytic System Satisfying Quick Warm Up and High Heat Resistance by T. Takada, H. Hirayama, T. Itoh and T. Yaegashi, Toyota Motor Corp., 1996.

SAE 961904 Washcoat Technology and Precious Metal Loading Study Targeting the California Lev MDV2 Standard by R. Smaling and S. Sung, Engelhard Corporation and R. Bartlett, General Motors Corp., 1996.

SAE 950254, High Temperature Ultra Stable Close–Coupled Catalysts by Z. Hu and R.M. Heck, Engelhard Corporation, 1995.

SAE 980663, Development of Close–Coupled Catalyst Systems for European Driving Conditions by A. Waltner, G. Loose, A. Hirschmann—Daimler–Benz AG and L. Mussmann, D. Lindner, W. Müller—Degussa AG, 1998.

SAE 932765 A Warm–Up and Underfloor Converter Parametric Study (Oct. 1993).

SAE 960796 The Development of a Close Coupled Plus Underfloor Catalyst for a ULEV Application (1996).

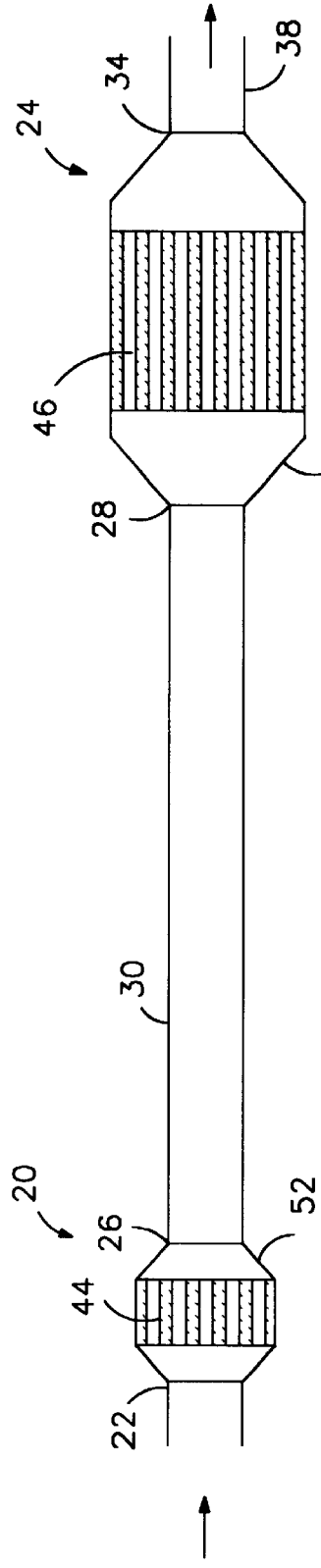
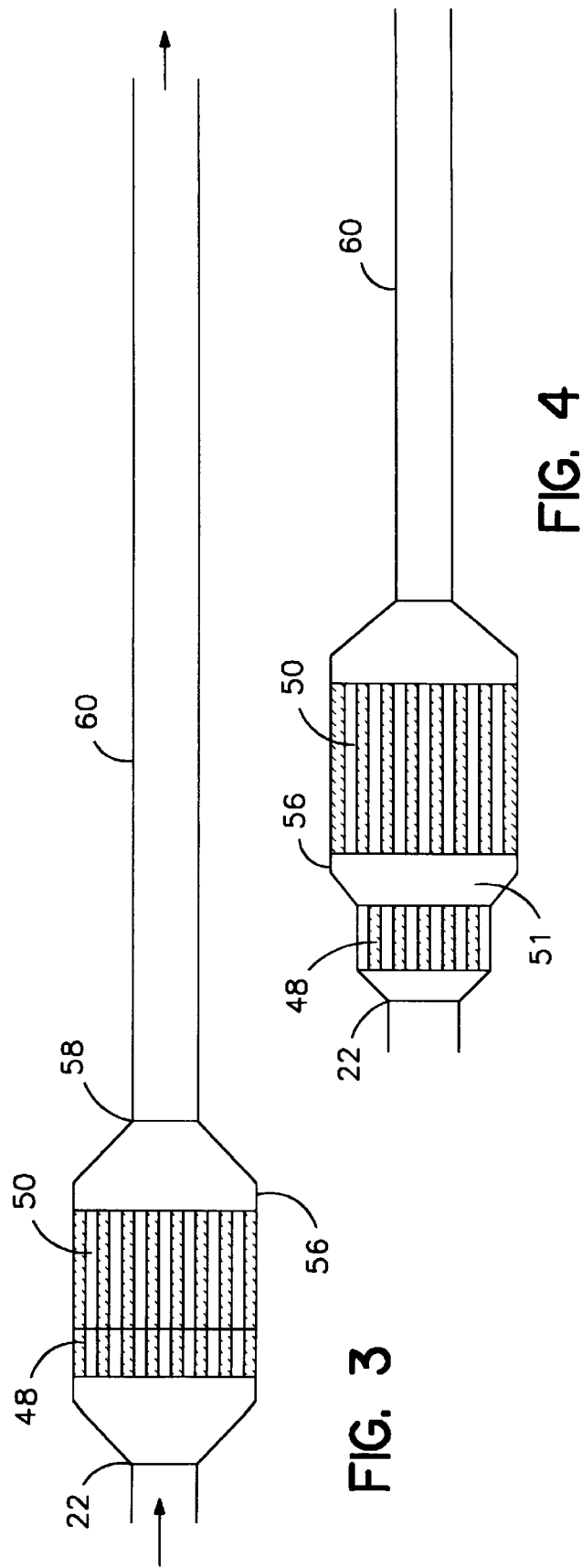

CLOSE COUPLED CATALYST

BACKGROUND OF THE INVENTION

1. Field of the Invention

The present invention relates to an article and method comprising a catalyst composition useful for the treatment of gases to reduce pollutants contained therein. More specifically, the present invention is concerned with catalysts of the type generally referred to as "close coupled catalysts" which are designed to reduce pollutants in engine exhaust emissions during engine cold start conditions.

2. Description of the Related Art

California Low Emission Vehicle standards require significantly higher emissions reduction, especially for hydrocarbon and nitrogen oxides. For a typical vehicle, a large portion (up to 80%) of the hydrocarbon emissions occurs during the first phase of the Federal Test Procedure ("FTP"). A variety of technologies are under development to reduce cold start hydrocarbon emissions, including close coupled catalysts as disclosed in Ball, D. J., "Distribution of Warm-Up and Underfloor Catalyst Volumes", SAE 922338, 1992; electrically heated catalysts as disclosed in Piotrowski, G. K., "Evaluation of a Resistively Heated Metal Monolith Catalytic Converter on a Gasoline-Fueled Vehicle", EPA/AA/CTAAB/88–12, 1988 and Hurley, R. G. "Evaluation of Metallic and Electrically Heated Metallic Catalysts on a Gasoline Fueled Vehicle", SAE 900504, 1990; hydrocarbon absorbers as disclosed in Heimrich, M. J., Smith, L. R., and Kitowski, J., "Cold Start Hydrocarbon Collection for Advanced Exhaust Emission Control, SAE 920847, 1992 and Hochmuth, J. K., Burk, P. L., Telentino, C., and Mignano, M. J., "Hydrocarbon Traps for Controlling Cold Start Emissions", SAE 930739, 1993; by-pass catalysts as disclosed in Fraidl, G. K., Quissrk, F. and Winklhofer, E., "Improvement of LEV/ULEV Potential of Fuel Efficient High Performance Engines," SAE 920416, 1992; and burners as disclosed in Ma, T., Collings, N. and Hands, T., "Exhaust Gas Ignition (EGI)—A New Concept for Rapid Light-off of Automotive Exhaust Catalyst, SAE 920400, 1992. It has been reported that close coupled catalysts, especially Pd-containing catalysts, are very effective at reducing HC emission during cold start of the FTP cycle as disclosed in Ball, D. J., "Distribution of Warm-Up and Underfloor Catalyst Volumes", SAE 922338, 1992; Summers, J. C., Skowron, J. F., and Miller, M. J., "Use of Light-Off Catalysts to Meet the California LEV/ULEV Standards", SAE 930386, 1993 and Ball, D. J., "A Warm-up and Underfloor Converter Parametric Study", SAE 932765, 1993. Recently, Ford has reported a successful application of Pd-only catalyst for meeting stringent emission standards as disclosed in Dettling, J., Hu, Z, Lui, Y., Smaling, R., Wan, C and Punke, A., "SMART Pd TWC Technology to Meet Stringent Standards", Presented at CAPoC$_3$ Third International Congress on Catalyst and Automobile Pollution Control, April 20–22, 1994, Brussels.

The principal function of a close coupled catalyst, also referred to as "precat" and "warm-up" catalysts, is to reduce hydrocarbon emissions during cold start. Cold start is the period immediately after starting the engine from ambient conditions. The cold start period depends on the ambient temperature, the type of engine, the engine control system and engine operation. Typically, the cold start period is within the first two minutes after the start of an engine at ambient temperature, FTP Test 1975 characterize cold start as the first bag of the FTP driving cycle which lasts for the first 505 seconds after starting an engine from ambient temperature, typically at 26° C. This is accomplished by locating at least part of the total exhaust system catalyst closer to the engine than traditional "underfloor catalyst". The underfloor catalyst are typically located beneath the floor of the vehicle. The close coupled catalyst is located in the engine compartment, i.e., beneath the hood and adjacent to the exhaust manifold. There are two possible strategies for implementing a close coupled catalyst. The close coupled catalyst can occupy the entire catalyst volume or be a small volume catalyst used in conjunction with an underfloor catalyst. The design option depends on the engine configuration, size and space available.

Catalysts at the close coupled position are also exposed to high temperature exhaust gas immediately exiting the engine after the engine has warmed up. As a consequence, the close coupled catalyst must have high temperature stability to be durable enough for meeting stringent emission standards as disclosed in Bhasin, M. et al, "Novel Catalyst for Treating Exhaust Gases from Internal Combustion and Stationary Source Engines", SAE 93054, 1993. In the present day vehicle control strategies, overfueling or fuel enrichment is used to cool the engine exhaust prior to the catalyst during high load operation or high exhaust temperature conditions. This strategy results in increased hydrocarbon emissions and may be eliminated in future regulations as disclosed in "Acceleration Enrichment May Be Large Source of Pollution", WARD'S Engine and Vehicle Technology Update, Dec. 1, 1993, p.4. This could result in 50 to 100° higher exposure temperatures for the catalyst. Thus, the close coupled catalyst could be exposed to temperatures as high as 1050° C. Additionally, high speed Autobahn driving conditions can expose the close coupled catalyst to such high temperatures.

A typical motor vehicle catalyst is an underfloor three-way conversion catalysts ("TWC") which catalyzes the oxidation by oxygen in the exhaust gas of the unburned hydrocarbons and carbon monoxide and the reduction of nitrogen oxides to nitrogen. TWC catalysts which exhibit good activity and long life comprise one or more platinum group metals (e.g., platinum or palladium, rhodium, ruthenium and iridium) located upon a high surface area, refractory oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material.

U.S. Pat. No. 4,134,860 relates to the manufacture of catalyst structures. The catalyst composition can contain platinum group metals, base metals, rare earth metals and refractory, such as alumina support. The composition can be deposited on a relatively inert carrier such as a honeycomb.

The high surface area alumina support materials, also refer-red to as "gamma alumina" or "activated alumina", typically exhibit a BET surface area in excess of 60 square meters per gram ("m$^2$/g"), often up to about 200 m$^2$/g or more. Such activated alumina is usually a mixture of the gamma and delta phases of alumina, but may also contain substantial amounts of eta, kappa and theta alumina phases. It is disclosed to utilize refractory metal oxides other than activated alumina as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst.

In a moving vehicle, exhaust gas temperatures can reach 1000° C., and such elevated temperatures cause the activated alumina (or other) support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as baria, calcia or strontia or rare earth metal oxides, such as ceria, lanthana and mixtures of two or more rare earth metal oxides. For example, see C. D. Keith et al U.S. Pat. No. 4,171,288.

Bulk cerium oxide (ceria) is disclosed to provide an excellent refractory oxide support for platinum group metals other than rhodium, and enables the attainment of highly dispersed, small crystallites of platinum on the ceria particles, and that the bulk ceria may be stabilized by impregnation with a solution of an aluminum compound, followed by calcination. U.S. Pat. No. 4,714,694 of C. Z. Wan et al, discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, is also disclosed in U.S. Pat. No. 4,727,052 of C. Z. Wan et al and in U.S. Pat. No. 4,708,946 of Ohata et al.

U.S. Pat. No. 4,923,842 discloses a catalytic composition for treating exhaust gases comprising a first support having dispersed thereon at least one oxygen storage component and at least one noble metal component, and having dispersed immediately thereon an overlayer comprising lanthanum oxide and optionally a second support. The layer of catalyst is separate from the lanthanum oxide. The nobel metal can include platinum, palladium, rhodium, ruthenium and iridium. The oxygen storage component can include the oxide of a metal from the group consisting of iron, nickel, cobalt and the rare earths. Illustrative of these are cerium, lanthanum, neodymium, praseodymium, etc.

Oxides of cerium and praseodymium are particularly useful as oxygen storage components.

U.S. Pat. No. 4,808,564 discloses a catalyst for the purification of exhaust gases having improved durability which comprises a support substrate, a catalyst carrier layer formed on the support substrate and catalyst ingredients carried on the catalyst carrier layer. The catalyst carrier layer comprises oxides of lanthanum and cerium in which the molar fraction of lanthanum atoms to total rare earth atoms is 0.05 to 0.20 and the ratio of the number of the total rare earth atoms to the number of aluminum atoms is 0.05 to 0.25.

U.S. Pat. No. 4,438,219 discloses an alumina supported catalyst for use on a substrate. The catalyst is stable at high temperatures. The stabilizing material is disclosed to be one of several compounds including those derived from barium, silicon, rare earth metals, alkali and alkaline earth metals, boron, thorium, hafnium and zirconium. Of the stabilizing materials barium oxide, silicon dioxide and rare earth oxides which include lanthanum, cerium, praseodymium, neodymium, and others are indicated to be preferred. It is disclosed that contacting them with a calcined alumina film permits the calcined alumina film to retain a high surface area at higher temperatures.

U.S. Pat. Nos. 4,476,246, 4,591,578 and 4,591,580 disclose three-way catalyst compositions comprising alumina, ceria, an alkali metal oxide promoter and noble metals. U.S. Pat. No. 4,591,518 discloses a catalyst comprising an alumina support with components deposited thereon consisting essentially of a lanthana component, ceria, an alkali metal oxide and a platinum group metal. U.S. Pat. No. 4,591,580 discloses an alumina supported platinum group metal catalyst. The support is sequentially modified to include support stabilization by lanthana or lanthana rich rare earth oxides, double promotion by ceria and alkali metal oxides and optionally nickel oxide.

Palladium containing catalyst compositions e.g. U.S. Pat. No. 4,624,940 have been found useful for high temperature applications. The combination of lanthanum and barium is found to provide a superior hydrothermal stabilization of alumina which supports the catalytic component, palladium.

U.S. Pat. No. 4,780,447 discloses a catalyst which is capable of controlling HC, CO and $NO_x$ as well as $H_2S$ in emissions from the tailpipe of catalytic converter equipped automobiles. The use of the oxides of nickel and/or iron is disclosed as a $H_2S$ gettering of compound.

U.S. Pat. No. 4,965,243 discloses a method to improve thermal stability of a TWC catalyst containing precious metals by incorporating a barium compound and a zirconium compound together with ceria and alumina. This is stated to form a catalytic moiety to enhance stability of the alumina washcoat upon exposure to high temperature.

J01210032 (and AU-615721) discloses a catalytic composition comprising palladium, rhodium, active alumina, a cerium compound, a strontium compound and a zirconium compound. These patents suggests the utility of alkaline earth metals in combination with ceria, zirconia to form a thermally stable alumina supported palladium containing washcoat.

U.S. Pat. Nos. 4,624,940 and 5,057,483 refer to ceria-zirconia containing particles. It is found that ceria can be dispersed homogeneously throughout the zirconia matrix up to 30 weight percent of the total weight of the ceria-zirconia composite to form a solid solution. A co-formed (e.g. co-precipitated) ceria oxide-zirconia particulate composite can enhance the ceria utility in particles containing ceria-zirconia mixture. The ceria provides the zirconia stabilization and also acts as an oxygen storage component. The '483 patent discloses that neodymium and/or yttrium can be added to the ceria-zirconia composite to modify the resultant oxide properties as desired.

U.S. Pat. No. 4,504,598 discloses a process for producing a high temperature resistant TWC catalyst. The process includes forming an aqueous slurry of particles of gamma or activated alumina and impregnating the alumina with soluble salts of selected metals including cerium, zirconium, at least one of iron and nickel and at least one of platinum, palladium and rhodium and, optionally, at least one of neodymium, lanthanum, and praseodymium. The impregnated alumina is calcined at 600° C. and then dispersed in water to prepare a slurry which is coated on a honeycomb carrier and dried to obtain a finished catalyst.

Japanese Kokai 71538/87 discloses a catalyst layer supported on a catalyst carrier and containing one catalyst component selected from the group consisting of platinum, palladium and rhodium. An alumina coat layer is provided on the catalyst layer. The coat layer contains one oxide selected from the group consisting of cerium oxide, nickel oxide, molybdenum oxide, iron oxide and at least one oxide of lanthanum and neodymium (1–10% by wt.).

U.S. Pat. Nos. 3,956,188 and 4,021,185 disclose a catalyst composition having (a) a catalytically active, calcined composite of alumina, a rare earth metal oxide and a metal oxide selected from the group consisting of an oxide of chromium, tungsten, a group IVB metal and mixtures thereof and (b) a catalytically effective amount of a platinum group metal added thereto after calcination of said composite. The rare earth metals include cerium, lanthanum and neodymium.

Japanese Patent J-63-077544-A discloses a layered automotive catalyst having a first layer comprising palladium dispersed on a support comprising alumina, lanthana and other rare earth oxides and a second coat comprising rhodium dispersed on a support comprising alumina, zirconia, lanthana and rare earth oxides.

U.S. Pat. No. 4,587,231 discloses a method of producing a monolithic three-way catalyst for the purification of exhaust gases. First, a mixed oxide coating is provided to a monolithic carrier by treating the carrier with a coating slip in which an active alumina powder containing cerium oxide is dispersed together with a ceria powder and then baking the treated carrier. Next platinum, rhodium and/or palladium are deposited on the oxide coating by a thermal decomposition. Optionally, a zirconia powder may be added to the coating slip.

U.S. Pat. No. 5,057,483 discloses a catalyst composition suitable for three-way conversion of internal combustion engine, e.g., automobile gasoline engine, exhaust gases includes a catalytic material disposed in two discrete coats on a carrier. The first coat includes a stabilized alumina support on which a first platinum catalytic component is dispersed and bulk ceria, and may also include bulk iron oxide, a metal oxide (such as bulk nickel oxide) which is effective for the suppression of hydrogen sulfide emissions, and one or both of baria and zirconia dispersed throughout the first coat as a thermal stabilizer. The second coat, which may comprise a top coat overlying the first coat, contains a co-formed (e.g., co-precipitated) rare earth oxide-zirconia support on which a first rhodium catalytic component is dispersed, and a second activated alumina support having a second platinum catalytic component dispersed thereon. The second coat may also include a second rhodium catalytic component, and optionally, a third platinum catalytic component, dispersed as an activated alumina support.

It is a continuing goal to develop a close coupled catalyst system which is inexpensive and stable. The system should have the ability to oxidize hydrocarbons at low temperatures.

SUMMARY OF THE INVENTION

The present invention relates to a stable close-coupled catalyst, an article comprising such a close-coupled catalyst and a related method of operation.

The close-coupled catalyst of the present invention has been designed to reduce hydrocarbon emissions from gasoline engines during cold starts. More particularly, the close-coupled catalyst is designed to reduce pollutants in automotive engine gas streams at temperatures as low as 350° C., preferably as low as 300° C. and more preferably as low as 200° C. The close-coupled catalyst of the present invention comprises a close-coupled catalyst composition which catalyzes low temperature reactions. This is indicated by the light-off temperature. The light-off temperature for a specific component is the temperature at which 50% of that component reacts.

The close-coupled catalyst is placed close to an engine to enable it to reach reaction temperatures as soon as possible. However, during steady state operation of the engine, the proximity of the close-coupled catalyst to the engine, typically less than one foot, more typically less than six inches and commonly attached directly to the outlet of the exhaust manifold exposes the close-coupled catalyst composition to exhaust gases at very high temperatures of up to 1100° C. The close-coupled catalyst in the catalyst bed is heated to high temperature by heat from both the hot exhaust gas and by heat generated by the combustion of hydrocarbons and carbon monoxide present in the exhaust gas. In addition to being very reactive at low temperatures, the close-coupled catalyst composition should be stable at high temperatures during the operating life of the engine.

As indicated in the Background of the Invention, gasoline engines typically release exhaust gas pollutants which include hydrocarbons, carbon monoxide and nitric oxides. Typical catalytic converters are located "under the floor" of the automobile. Such catalytic converters comprise catalyst compositions which act as "three-way catalysts" (TWC). The TWC catalysts oxidize carbon monoxide and hydrocarbons and reduce nitric oxides. The carbon monoxide is oxidized to carbon dioxide and the hydrocarbons are oxidized to water and carbon dioxide. The nitric oxide is typically reduced to nitrogen gas.

The close-coupled catalyst present invention accomplishes the oxidation of carbon monoxide and hydrocarbons and reduction of nitrogen oxides at "cold start" conditions reviewed in the Background. Such conditions are as low as 350° C., preferably 300° C. and more preferably as low as 200° C. At the same time, the close-coupled catalyst composition is thermally stable upon exposure to temperature up to 1100° C. and higher during the operating life of the engine. This has been accomplished by increasing thermal stability of the catalyst washcoat, and by controlling the reaction of carbon monoxide in the close-coupled catalyst bed and therefore reducing temperature rise related to carbon monoxide combustion in the catalyst bed. At the same time, the close-coupled catalyst compositions provides a relatively high hydrocarbon conversion. A catalyst downstream of the close-coupled catalyst can be an underfloor catalyst or a downstream catalyst. When the underfloor catalyst is heated to a high enough temperature to reduce the pollutants, the reduced conversion of carbon monoxide in the close-coupled catalyst results in a cooler close-coupled catalyst and enables the downstream catalyst typically the underfloor three-way catalyst to burn the carbon monoxide and run more effectively at a higher temperature.

The close-coupled catalyst composition of the present invention comprises components of the type used in a TWC catalyst composition except that there is substantially no oxygen storage components. The removal of the oxygen storage components from the close-coupled catalyst composition of the present invention results in controlled bypass of carbon monoxide. For the purposes of the present invention, components which have oxygen storage and release capabilities include cerium oxide and praseodymium oxide. Equivalent amounts of other rare earths having less significant oxygen storage capability are not considered to be components which have substantial oxygen storage and release capability. Additionally, platinum group metal components are not considered to be oxygen storage components. In particular, the close-coupled catalyst composition can be a three-way catalyst composition having substantially no ceria. Minor amounts of ceria or praseodymium oxide may be present as impurities or trace amounts. Oxygen storage component such as cerium oxide store oxygen and release it during operating conditions providing additional oxygen to enable the oxidation of hydrocarbons and carbon monoxides to proceed more efficiently. However, this function has been found to result in excess oxidation and overheating of the close-coupled catalyst.

The present composition includes a palladium component, preferably at relatively high concentration. Accordingly, during cold start operation, a relatively high amount of hydrocarbons are oxidized, and a significant amount of carbon monoxide, although not all of the carbon monoxide is oxidized. Additionally, a significant amount of nitrogen oxides are reduced. In addition, the absence of oxygen storage component, particularly cerium compounds in the close-coupled catalyst limits the amount of carbon monoxide oxidation in the close-coupled catalyst even when the engine exhaust gases are hot and the downstream (underfloor) catalyst has reached operating temperatures. The carbon monoxide which does not react in the close-coupled catalyst passes to the downstream catalyst where it is catalytically oxidized, and such oxidation increases the temperature of the downstream catalyst resulting in a more effective operation. Accordingly, the close-coupled catalyst of the present invention is sufficiently effective to eliminate a significant amount of pollutants at low temperatures while at the same time being stable over long periods of engine operation while providing a sufficient amount of carbon monoxide to the downstream catalyst to permit it to operate effectively.

The present invention includes an article comprising a gasoline engine having an exhaust outlet, typically connected in communication to the inlet of an exhaust manifold. The close-coupled catalyst is in communication with the exhaust outlet and is typically connected in communication with the exhaust manifold outlet. The close-coupled catalyst can be connected directly to the gasoline engine outlet or exhaust manifold outlet. Alternatively, it can be connected by a short exhaust pipe, typically up to about one foot long to the exhaust outlet or exhaust manifold outlet of the gasoline engine. The close-coupled catalyst has an outlet which is connected in communication with the inlet of the downstream preferably underfloor catalytic converter. Exhaust pipes can be connected from the outlet of the close-coupled catalyst outlet and the inlet of the underfloor catalytic converter inlet. The underfloor catalytic converter has an outlet which can be connected to outlet exhaust pipes through which the exhaust gas passes from the vehicle into the atmosphere. The close-coupled catalyst comprises a close-coupled catalyst composition. The underfloor catalyst preferably comprises a three-way catalyst composition containing ceria.

The close-coupled catalyst composition of the present invention is substantially free of oxygen storage components such as ceria and praseodymia. The catalyst composition comprises a support which preferably comprises at least one compound selected from the group consisting of silica, alumina, titania and a first zirconia compound hereinafter referred to as a first zirconia compound. The composition further comprises a palladium component, preferably in an amount sufficient to oxidize carbon monoxide and hydrocarbons and reduce nitric oxides to have respective light-off temperatures at 50% conversion which are relatively low and preferably in the range of from 200 to 350° C. for the oxidation of hydrocarbons. The composition optionally comprises at least one alkaline metal oxide selected from the group consisting of strontium oxide, calcium oxide and barium oxide with strontium oxide most preferred. The composition can optionally also comprise other precious metal or platinum group metal components, preferably including at least one metal selected from the group consisting of platinum, rhodium, ruthenium and iridium components. Where additional platinum group metals are included, if platinum is used, it is used in an amount of less than 60 grams per cubic foot. Other platinum group metals are used in amounts of up to about 20 grams per cubic foot. The composition optionally also can include a second zirconium oxide compound as a stabilizer and optionally at least one rare earth oxide selected from the group consisting of neodymium oxide and lanthanum oxide.

The close-coupled catalyst preferably is in the form of a carrier supported catalyst where the carrier comprises a honeycomb type carrier. A preferred honeycomb type carrier comprises a composition having at least about 50 grams per cubic foot of palladium component, from 0.5 to 3.5 g/in$^3$ of activated alumina, and from 0.05 to 0.5 g/in$^3$ of at least one alkaline earth metal component, most preferably, strontium oxide. Where lanthanum and/or neodymium oxide are present, they are present in amounts up to 0.6 g/in$^3$.

The present invention comprises a method of operating a gasoline engine having an exhaust which comprises pollutants including carbon monoxide, hydrocarbons and optionally nitrogen oxide. The exhaust gas stream is passed from the engine outlet to the inlet of a close-coupled catalyst of the type described above. The gases contact with the close-coupled catalyst and reacts. The close-coupled catalyst has substantially no oxygen storage components, particularly ceria and praseodymia components. The exhaust gas can then pass to a downstream three-way catalyst which preferably comprises an oxygen storage component such as ceria.

In an optional embodiment, the three-way catalyst is included as part of the close-coupled catalytic article on a carrier which is within the close-coupled catalyst canister downstream from the close-coupled catalyst carrier.

BRIEF DESCRIPTION OF THE DRAWINGS

FIG. 2 is a schematic drawing showing a close-coupled catalyst used in combination with an underfloor catalyst.

FIG. 3 is an alternate embodiment of the present invention wherein the close-coupled catalyst is combined in a single housing with a second three-way catalyst which comprises an oxygen storage component such as ceria.

FIG. 4 is an alternate embodiment of the present invention wherein the close-coupled catalyst is used in combination with and spaced apart from the downstream catalyst.

DETAILED DESCRIPTION OF THE PREFERRED EMBODIMENTS

Figure 1:
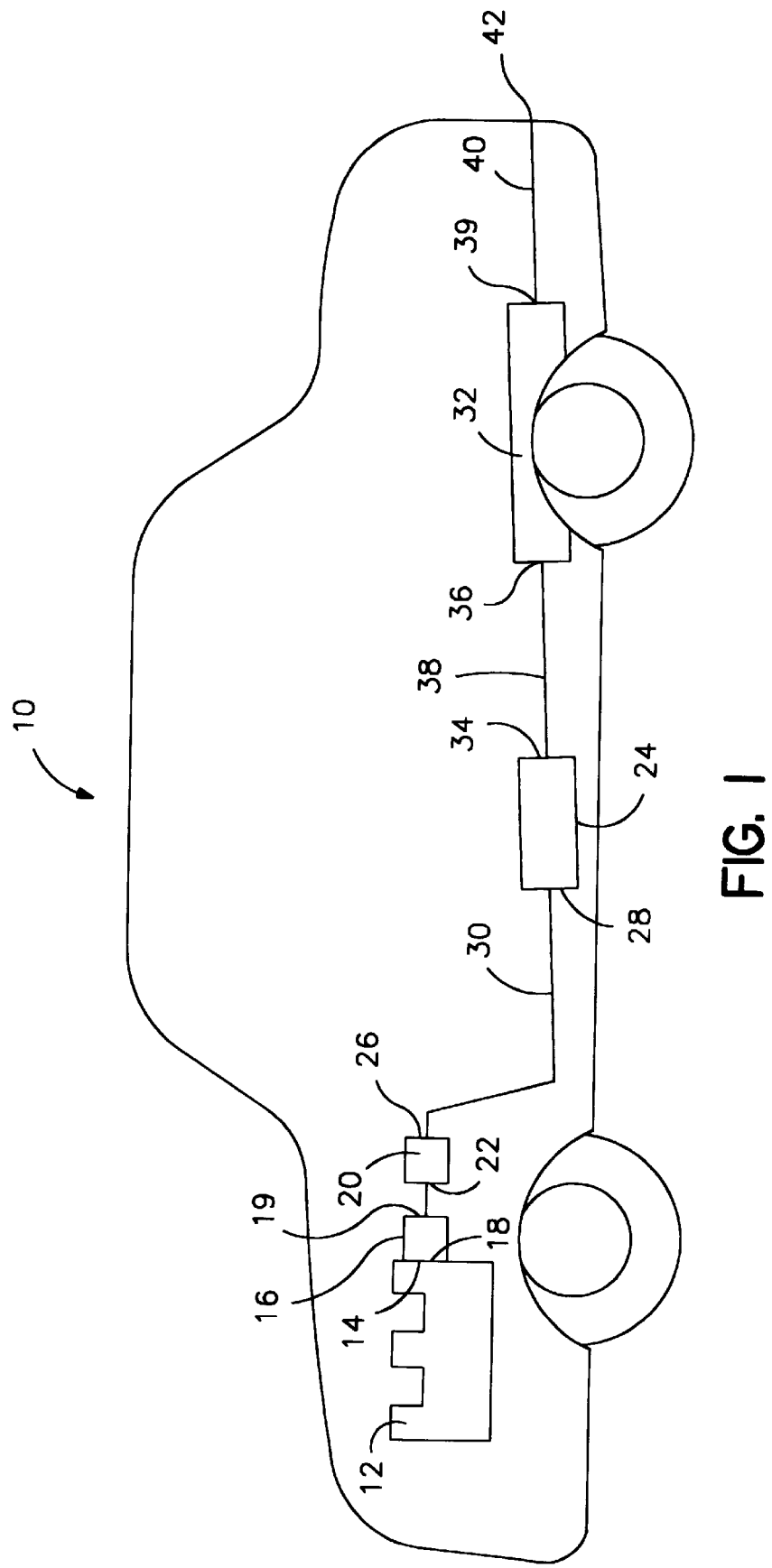
FIG. 1 is a schematic drawing of an automobile showing a preferred embodiment of the present invention.

The present invention will be understood by those skilled in the art by reference to the accompanying FIGS. 1, 2, 3 and 4.

The present invention comprises a close-coupled catalyst comprising a close-coupled catalyst composition in close proximity to the exhaust outlet of a gasoline engine. The catalyst composition comprises a support, a palladium component and preferably at least one alkaline metal oxide component, preferably strontium oxide. The close-coupled catalyst composition consists essentially of components having substantially no oxygen storage and release capability during operation of the gasoline engine. Preferably there is a catalyst downstream of the close-coupled catalyst which comprises at least one oxygen storage component and in particular ceria or praseodymia.

Reference is made to FIG. 1 which illustrates a particular and preferred embodiment of the present invention. FIG. 1 shows a motor vehicle 10 having a gasoline engine 12. The gasoline engine 12 has an engine exhaust outlet 14. In typical and preferred embodiments, the engine exhaust outlet 14 communicates to an engine exhaust manifold 16 through manifold inlet 18. A close-coupled catalyst is in close proximity to the engine exhaust manifold outlet 19. The manifold outlet 18 is connected and communicates with close-coupled catalyst 20 through close-coupled catalyst inlet 22. The close-coupled catalyst 20 is connected to and communicates with a downstream catalyst, such as underfloor catalytic converter 24. The close-coupled catalyst has a close-coupled catalyst outlet 26 which is connected to the underfloor catalyst 24 through the close-coupled catalyst exhaust pipe 30 to under floor catalyst inlet 28. The underfloor catalyst 24 is typically and preferably connected to muffler 32. In particular, the underfloor catalyst outlet 34 is connected to the muffler inlet 36 through underfloor exhaust pipe 38. The muffler has a muffler outlet 39 which is connected to tail pipe 40 having a tail pipe outlet 42 which opens to the environment.

FIG. 2 shows a schematic drawing of the close-coupled catalyst 20 in combination with underfloor catalyst 24. In this preferred embodiment, the close-coupled catalyst comprises a close-coupled honeycomb support 44 on which is coated the close-coupled catalyst composition. The underfloor catalyst 24 comprises an underfloor honeycomb 46 on which is coated an underfloor catalyst composition. The close-coupled catalyst honeycomb of FIG. 2 is sealingly mounted in close-coupled canister 52 which has close-coupled catalyst inlet 22 and close-coupled catalyst outlet 26 connected by close-coupled catalyst exhaust pipe 30 to the inlet 28 of underfloor catalyst 24 which is sealingly mounted in underfloor catalyst canister 54. Underfloor exhaust pipe 38 is connected to underfloor catalyst outlet 34.

FIG. 3 illustrates an alternative embodiments of the close-coupled catalyst which comprises two adjacent honeycombs. In this embodiment, the close-coupled catalyst comprises a combined close-coupled honeycomb support 48 on which is coated the close-coupled catalyst composition. The downstream catalyst comprises a combined downstream catalyst support 50, on which is coated, preferably, a three-way combined downstream catalyst composition. The combined close-coupled catalyst 48 and combined downstream catalyst 50 can be adjacent to each other, preferably having corresponding honeycomb designs. Alternatively, as shown in FIG. 4, they can be spaced apart. Finally, there can be one or more plurality of combined close-coupled catalyst honeycomb 48 and one or more combined downstream catalyst honeycomb 50.

FIGS. 3 and 4 show a combined close-coupled catalyst honeycomb 48 and three-way catalyst 50 honeycomb sealingly mounted in combined canister 56. The combined canister 56 has a close-coupled catalyst inlet 22 into which exhaust gases from the engine flow and a combined catalyst outlet 58 which leads to combined exhaust pipe 60. Combined exhaust pipe 60 leads to the inlet 36 of muffler 32. In FIG. 3, honeycombs 48 and 50 are adjacent and butting, and have similar adjacent profiles. FIG. 4 honeycombs 48 and 50 are spaced apart by space 51 and can have different opposing profiles.

Preferably, the amount close-coupled catalyst is less than the downstream, i.e., underfloor, catalyst with the relative amount of close-coupled catalyst composition being from 1/20 to 1/2 of the total of the close-coupled and underfloor catalyst composition based on the weight per volume of catalyst (i.e. g/in$^3$). Alternatively, the close-coupled catalyst volume (volume of honeycomb) is from 1/20 to 1/2 of the total catalyst volume.

The article of the present invention preferably includes a close-coupled catalyst composition comprising a support; a palladium component, and preferably at least one alkaline metal oxide. The composition provides three way catalyst activity and consists essentially no ceria, no oxygen storage components and in particular, no ceria or praseodymia. The close-coupled catalyst composition can optionally comprise, in addition to palladium, at least one platinum group metal component selected from the group consisting of platinum, rhodium, ruthenium and iridium in minor amounts relative to the palladium. Optionally and preferably, the composition further comprises at least one alkaline earth metal oxide and at least one rare earth oxide selected from the group consisting of neodymium oxide and lanthanum oxide. The composition further can optionally comprise a second zirconium oxide compound. A most preferred close-coupled catalyst composition comprises an active alumina support, a palladium component, strontium oxide, neodymium oxide, lanthanum oxide and a second zirconium oxide. The close-coupled catalyst composition is preferably coated on to a carrier such as a honeycomb substrate carrier.

When coated on to such a carrier, the amounts of the various components are presented based on grams per volume. When the compositions are applied as a thin coating to a monolithic carrier substrate, the amounts of ingredients are conventionally expressed as grams per cubic foot for platinum group metal components and grams of material per cubic inch of catalyst as this measure accommodates different gas flow passage cell sizes in different monolithic carrier substrates. For typical automotive exhaust gas catalytic converters, the catalyst composite which includes a monolithic substrate generally may comprise from about 0.50 to about 6.0, preferably about 1.0 to about 5.0 g/in$^3$ of catalytic composition coating. Preferred amounts of the various components are: from about 50 to about 400 g/ft$^3$ of palladium component; from 0 to 20 g/ft$^3$ of platinum group metal components selected from the group consisting of rhodium, ruthenium and iridium components and from 0 to 60 g/ft$^3$ of a platinum component. In order to attain the desired oxidation of hydrocarbon and controlled oxidation of carbon monoxide, the amount of palladium is preferably greater than the sum of all of the other platinum group metal components. The amount of the support material is preferable from 0.5 to about 3.5 g/in$^3$ with activated aluminum being most preferred. The amount of the alkaline earth metal compound is from about 0 to about 0.6 and preferable 0.05 to about 0.5 g/in$^3$. The amount of the rare earth metal oxide is preferably from 0.0 to 0.5 and more preferably 0.05 to 0.2 of each of the lanthanum and neodymium oxide compounds. The amount of the second zirconium oxide is from 0.00 to about 0.5 and preferably 0.05 to 0.2 g/in$^3$.

The downstream catalyst is preferably a three-way catalyst. Any suitable three-way catalyst known in the art can be used and, preferably comprises an oxygen storage component and in particular, ceria. Such catalysts typically comprise at least one platinum group metal component, typically selected from the group consisting of platinum, palladium, rhodium, ruthenium and iridium components. There is at least one catalyst support which can be selected from silica, alumina and titanium compounds, and typically and preferably are activated compounds selected from the group consisting of alumina, silica, silica-alumina, silica-silicates, alumina-zirconia, alumina-chromia and alumina-ceria. The three-way catalyst preferably comprises an oxygen storage component preferably selected from the group consisting of cerium and praseodymium compounds, preferably cerium oxide and praseodymium oxide. The composition preferably comprises at least one stabilizer which can be selected from alkaline earth metals components including components derived from magnesium, barium, calcium and strontium. The three-way catalyst can additionally include rare earth metals, preferably lanthanum and neodymium components. The most preferred three-way catalysts useful with the close-coupled catalyst of the present invention are disclosed in U.S. Pat. No. 5,597,771 entitled, "Layered Catalyst Composite" and hereby incorporated by reference.

In preparing the close coupled or downstream (TWC) catalyst, a platinum group metal catalytic component such as a suitable compound and/or complex of any of the platinum group metals may be utilized to achieve dispersion of the catalytic component on the activated alumina support particles. As used herein, the term "platinum group metal component" means any platinum group metal compound, complex, or the like which, upon calcination or use of the catalyst decomposes or otherwise converts to a catalytically active form, usually, the metal or the metal oxide. Water soluble compounds or water dispersible compounds or complexes of one or more platinum group metals may be utilized as long as the liquid used to impregnate or deposit the catalytic metal compounds onto the alumina support particles does not adversely react with the catalytic metal or its compound or complex or the other components of the slurry, and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum group metals are preferred. For example, suitable compounds are chloroplatinic acid, amine solubilized platinum hydroxide, rhodium chloride, rhodium nitrate, hexamine rhodium chloride, palladium nitrate or palladium chloride, etc. During the calcination step, or at least during the initial phase of use of the catalyst, such compounds are converted into a catalytically active form of the platinum group metal or a compound thereof.

When preparing a close-coupled catalyst, the amount of palladium component is sufficient to attain up to 500, and preferably 50 to 400 and more preferably 75 to 400 g/ft$^3$ of palladium. The other platinum group metal components can be up to about 60 g/ft$^3$ with the amount of platinum being up to 60 g/ft$^3$ and the amount of rhodium or ruthenium or iridium being up to about 20 g/ft$^3$.

When considering the underfloor catalyst or catalyst blocks adjacent and downstream in a single close coupled canister, the amount of platinum group metal components will depend on the platinum group metal components used. Where platinum is the main component, there can be up to 100 g/ft$^3$, and preferably 20 to 50 g/f t$^3$ of platinum Where palladium is used, there can be up to 500 and preferably from 50 to 300 g/ft$^3$. Where rhodium, ruthenium and iridium are used in combination with platinum or palladium there can be up to 100 g/ft$^3$ and preferably up to 50 g/ft$^3$.

Both the close-coupled catalyst composition and the downstream catalyst composition comprise a component which impart stabilization. The stabilizer can be selected from the group consisting of alkaline earth metal compounds. Preferred compounds include compounds derived from metals selected from the group consisting of magnesium, barium, calcium and strontium. It is known from U.S. Pat. No. 4,727,052 that support materials, such as activated alumina, can be thermally stabilized to retard undesirable alumina phase transformations from gamma to alpha at elevated temperatures by the use of stabilizers or a combination of stabilizers. The alkaline earth metal components are preferably alkaline earth metal oxide. In a particularly preferred composition, it is desirable to use strontium and preferably also barium as the compound in the close-coupled catalyst composition. The alkaline earth metal can be applied in a soluble form which upon calcining becomes the oxide. It is preferred that strontium and barium components be provided as water soluble compound such as barium nitrate or barium hydroxide, strontium nitrate, all of which upon calcining become the oxides. Additionally, both the close-coupled catalyst composition and the downstream catalyst composition contain a compound derived from zirconium, preferably zirconium oxide. The second zirconium compound can be provided as a water soluble compound such as zirconium acetate or as a relatively insoluble compound such as zirconium hydroxide. There should be an amount sufficient to enhance the stabilization and promotion of the respective compositions.

One or more thermal stabilizers can be applied to a previously calcined coating of the activated alumina and catalytic components on a carrier substrate. Alternatively or additionally, one or more modifiers may be applied to the activated alumina either before or after the alumina particles are formed into an adherent, calcined coating on the carrier substrate. (As used herein, a "precursor", whether of a thermal stabilizer, or other modifier or other component, is a compound, complex or the like which, upon calcining or upon use of the catalyst, will decompose or otherwise be converted into, respectively, a thermal stabilizer, other modifier or other component.) The presence of one or more of the metal oxide thermal stabilizers tends to retard the phase transition of high surface area alumina such as gamma and eta alumina to alpha-alumina, which is a low surface area alumina. The retardation of such phase transformation tends to prevent or reduce the occlusion of the catalytic metal component by the alumina with the consequent decrease of catalytic activity.

In each of the close-coupled and downstream catalyst compositions, the amount of metal oxide thermal stabilizer combined with the alumina may be from about 0.05 to 30 weight percent, preferably from about 0.1 to 25 weight percent, based on the total weight of the combined alumina, stabilizer and catalytic metal component.

Both the close-coupled catalyst composition and the downstream composition can contain at least one first promoter selected from the group consisting of lanthanum metal components and neodymium metal components with the preferred components being lanthanum oxide (lanthana) and neodymium oxide (neodymia). While these compounds are disclosed to act as stabilizers, they can also act as reaction promoters for the respective first and second layer compositions. A promoter is considered to be a material which enhances the conversion of a desired chemical to another. In the downstream catalyst composition, the promoter enhances the catalytic conversion of carbon monoxide and hydrocarbons into water and carbon dioxide and nitrogen oxides into nitrogen and oxygen.

The lanthanum and neodymia and/or neodymium is preferably in the form of their oxides. However, these compounds are preferably initially provided in a soluble form such as an acetate, halide, nitrate, sulfate or the like to impregnate the solid components for conversion to oxides.

It is preferred that in both the top coat and the bottom coat that the promoter be in intimate contact with the other components in the composition including and particularly the platinum group metal.

The downstream (or underfloor) catalyst of the present invention preferably contains an oxygen storage component preferably a cerium or praseodymium compound with the most preferred oxygen storage component being cerium oxide (ceria). The oxygen storage component can be present at least 5 wt. % and preferably at least 10 wt. % and more preferably at least 15 wt. % of the catalyst composition. The oxygen storage component can be included by dispersing methods known in the art. Such methods can include impregnation onto the first composition by impregnating the oxygen storage component onto the platinum group metal containing support in the form of an aqueous solution, drying and calcining the resulted mixture in air to give a first layer which contains an oxide of the oxygen storage component in intimate contact with the platinum group metal. Typically, impregnation means that there is substantially sufficient liquid to fill the pores of the material being impregnated. Examples of water soluble, decomposable oxygen storage components which can be used include, but are not limited to, cerium acetate, praseodymium acetate, cerium nitrate, praseodymium nitrate, etc. U.S. Pat. No. 4,189,404 discloses the impregnation of alumina-based support composition with cerium nitrate.

Alternatively, the oxygen storage component which is preferably ceria and/or praseodymia in bulk form. By bulk form it is meant that the ceria and/or praseodymia is present as discrete particles which may be as small as 1 to 15 microns in diameter or smaller, as opposed to having been dispersed in solution as in the first layer. A description and the use of such bulk components is presented in U.S. Pat. No. 4,714,694, hereby incorporated by reference. As noted in U.S. Pat. No. 4,727,052, also incorporated by reference, bulk form means that particles of ceria are admixed with particles of activated alumina so that the ceria is present in solid or bulk form as opposed to, for example, impregnating alumina particles with a solution of ceria compound which upon calcination is converted to ceria disposed within the alumina particles.

In addition to the above listed components of the downstream catalyst composition, the downstream catalyst composition can contain composites of zirconia and at least one rare earth oxide. Such materials are disclosed for example in U.S. Pat. Nos. 4,624,940 and 5,057,483, hereby incorporated by reference. Particularly preferred are particles comprising greater than 50% of a zirconia-based compound and preferably from 60 to 90% of zirconia, from 10 to 30 wt. % of ceria and optionally up to 10 wt. %, and when used at least 0.1 wt. %, of a non-ceria rare earth oxide useful to stabilize the zirconia selected from the group consisting of lanthana, neodymia and atria.

The close-coupled catalyst composition, but more preferably the downstream composition of the present invention can contain other conventional additives such as sulfide suppressants, e.g., nickel or iron components. If nickel oxide is used, an amount from about 1 to 25% by weight of the first coat can be effective. As disclosed in commonly owned Ser. No. 07/787,192, hereby incorporated by reference.

The close-coupled catalyst composition of the present invention and the downstream catalyst composition of the present invention can be prepared and formed into pellets by known means or applied to a suitable substrate, preferably a metal or ceramic honeycomb carrier.

Any suitable carrier may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 600 or more gas inlet openings ("cells") per square inch of cross section. The ceramic carrier may be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based corrosion resistant alloys.

Such monolithic carriers may contain up to about 700 or more flow channels ("cells") per square inch of cross section, although far fewer may be used. For example, the carrier may have from about 60 to 600, more usually from about 200 to 400, cells per square inch ("cpsi").

In accordance with the method of operation of the present invention, the gasoline engine is started from ambient conditions. While any ambient conditions can be used in accordance with the present method, for comparative purposes ambient engine temperature is considered to be in the range of from 10 to 30° C. and more specifically about 25° C. The engine is started and operated from a cold start. Referring to FIG. 1, gasoline engine 12 is preferably a typical engine 12 having an engine exhaust manifold 16. Exhaust gas passes from engine exhaust outlet 14, through manifold inlet 18, into the engine exhaust manifold 16 and out of the manifold through manifold outlet 19 to a close-coupled catalyst 20 through close-coupled catalyst inlet 22.

The exhaust gas comprises carbon monoxide and hydrogen, and optionally but typically nitrogen oxide. In the close-coupled catalyst 20, the exhaust gas is contacted with a close-coupled catalyst composition as recited above having substantially no oxygen storage components. The close-coupled catalyst oxidizes at least some of the hydrocarbons and reduces at least some of the nitrogen oxides present but oxidizes only a portion of the carbon monoxide present.

For comparative purposes when tested according to FTP 1975, less than 90, preferably less than 75, more preferably less than 30 and most preferably less than 60 mole percent of the carbon monoxide is oxidized in the close-coupled catalyst. Stated another way, when tested according to the FTP 1975 test, at least 10, preferably at least 25, more preferably at least 30 and most preferably at least 40 mole percent of the carbon monoxide is not oxidized in the close-coupled catalyst and will pass from the close-coupled catalyst is to a downstream, typically underfloor catalyst 24.

The downstream catalyst 24 preferably comprises a three-way catalyst composition as recited above which comprises an oxygen storage component, most preferably selected from cerium and praseodymium components, preferably cerium oxide and/or praseodymium oxide and most preferably cerium oxide.

The method of the present invention results in improved cold start oxidation of hydrocarbons and reduction of nitrous oxide while limiting the amount of carbon monoxide oxidizing. However, the limitation of the carbon monoxide enables the cold start catalyst to have improved long term stability in view of the high temperature gases it must endure during operation of the warmed-up engine. Finally, by enabling the cold start catalyst to use with increased carbon monoxide bypass, the cold start catalyst of the present invention enables the downstream catalyst to be more effective by virtue of the heat generated during oxidation of the increased carbon monoxide.

EXAMPLES

The following examples are presented to provide more complete understanding of the invention. The specific techniques, conditions, materials, proportions and reported data set forth to illustrate the principles and practice of the invention are exemplary and should not be construed as limiting the scope of the invention.

Example 1

Seven hundred thirty eight grams of gamma alumina powder having a surface area of about 160 square meters per gram (160 m$^2$/g) were impregnated with an aqueous palladium nitrate solution containing 34.5 grams of palladium. All 34.5 grams of palladium were impregnated. The palladium containing alumina, and a zirconium acetate solution in an amount sufficient to form 60.1 grams of $ZrO_2$ were ballmilled with deionized water to form a slurry. A washcoat slurry was formed by further mixing the further slurry with lanthanum nitrate solution in an amount sufficient to form 114 grams $La_2O_3$, neodymium nitrate solution in an amount sufficient to form 95.9 grams $Nd_2O_3$, barium oxide in an amount sufficient to form 54 grams BaO, strontium nitrate crystals in an amount sufficient to form 60 grams SrO. The slurry contained about 48 percent by weight of solids. A monolith support made of cordierite and containing about 400 flow passages per square inch of cross section was dipped into the washcoat slurry. The excess was blown off the monolith using compressed air. The resultant catalyzed monolith after being calcined at 450° C. contained 100 g/ft$^3$ palladium, 1.23 g/in$^3$alumina, 0.19 g/in$^3$ $La_2O_3$, 0.1 g/in$^3$ $ZrO_2$, 0.1 g/in$^3$ strontium oxide, and 0.16 g/in$^3$ $Nd_2O_3$.

In this formulation, no oxygen storage materials such as cerium oxide or praseodymium oxide was used. The high efficiency of the palladium component was used to provide low light-off temperatures. The absence of an oxygen storage component allowed carbon monoxide to bypass the close-coupled catalyst and reach the underfloor catalyst. This reduced the maximum close-coupled catalyst temperature and enhanced catalyst durability and increased the temperature and efficiency of the underfloor catalyst.

Example 2

Comparative Example

A catalyst washcoat composition coated monolithic catalyst structure was prepared using a two layered catalyst having the same loadings in the combination of both layers as described in Example 1. In this comparative example, the composition additionally contained 0.4 g/in$^3$ of a co-formed ceria-zirconia composite, 0.3 g/in$^3$ of ceria introduced into the slurry as cerium nitrate and 0.23 g/in$^3$ of ceria introduced as cerium hydroxide.

Testing

Samples of the catalyst honeycomb substrate structure were cored from the monoliths as cylinders 1.5 inches in diameter and 3 inches in length of Example 1 and 2. The axis of the cylinder was parallel to the axis of the honeycomb passages. Each core was individually aged in 10% steam in air at 950° C. for 12 hours. After the aging, the catalyzed cores were evaluated using a laboratory reactor with a simulated exhaust composition (Feed Gas) under 50,000 VHSV (Gas Volume per Hour per Substrate Volume). The steady state gas composition was 0.33 mole % CO, 0.41 mole % $O_2$, 16.00 mole % $CO_2$, 10 mole % $H_2O$, 540 PPM Hydrocarbons (HC), 1,540 PPM $NO_x$, and the balance of $N_2$. The perturbation composition was 0.76 mole %, 0.67 mole % $O_2$, 15.80 mole % $CO_2$, 10 mole % $H_2O$, 528 PPM HC, 1500 PPM $NO_x$, 45 PPM $SO_x$ and the balance of $N_2$. HC/CO/$NO_x$ conversions are measured while reactor temperature is gradually raised from ambient temperature to 500° C. Hydrocarbon concentration was measured using a flame ionizer detector (FID) carbon monoxide concentrations were measured using an infrared analyzer and $NO_x$ concentration was measured using a chemluminescent analyzer. The results of light off temperature are presented in Table I. The light off temperature is the temperature at which there is 50% conversion.

TABLE I

| | Light-Off Temperatures | | |
|---|---|---|---|
| | HC | CO | $NO_x$ |
| Ex 1 | 252 | 228 | 213 |
| Ex 2 (Comparative) | 287 | 258 | 236 |

The results summarized on Table I indicate that the Example 1 catalyst has lower light-off temperature for CO, HC and NOx than the Comparative catalyst. This indicates that the reaction in the close-coupled catalyst begins and is effective at lower temperatures.

Example 3

Comparative 4

In Example 3, monolith catalysts having a similar composition as Example 1 except that barium oxide was not included, were coated on cordierite honeycombs three inches in diameter by three inches in length and having 350 passages per square inch of cross section were canned and aged using a 4.6 liter engine exhaust gas streams for 85 hours. The maximum engine exhaust gas temperature at the catalyst inlet was 920° C. After the aging, the catalyst was evaluated using a 1.9 liter vehicle according to Federal Test Procedure (FTP) 1975. Comparative 4 was the same composition as Comparative 2 using the same substrate and tested according to the same procedure as Example 3. The results of HC/CO/$NO_x$ conversions are shown in Table II.

TABLE II

| | FTP 1975-Vehicle Test Conversion Efficiencies Mole % Conversion | | |
|---|---|---|---|
| | CO | HC | $NO_x$ |
| Ex 3 | 58.6% | 89.1% | 53.4% |
| Ex 4 (Comparative) | 69% | 86.5% | 47.2% |

The results summarized in Table II indicate that the Example 3 catalyst had higher HC and $NO_x$ conversions and lower CO conversion than the comparative catalyst. The high HC/NO$_x$ activities is related to high Pd activity in catalyst composition of Example 3 after the engine aging. The higher CO conversion in catalyst of Comparative Example 4 is due to ceria incorporated in the washcoat, which is known to enhance CO conversion. The CO conversion shows that by not including oxygen storage component ceria in Example 3, reaction in the close-coupled catalyst is controlled to enable CO to pass to an underfloor catalyst. The reduction of CO oxidation in the close-coupled catalyst will result in lower operating temperature and greater durability. The CO which passes to the underfloor catalyst will oxidize and enable the underfloor catalyst to operate at a warmer condition and more effectively eliminates exhaust gas pollutants. Comparative 4 is useful as an underfloor catalyst.

Modifications, changes, and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance of which the invention has promoted the art.

What is claimed is:

1. An article comprising:
   a gasoline engine having an exhaust outlet and optionally an exhaust manifold outlet;
   a close coupled catalyst located less than about one foot from the engine exhaust outlet or exhaust manifold outlet and in communication with the exhaust outlet to be exposed to temperatures including at least 920° C., the close coupled catalyst comprising a close coupled catalyst composition having substantially no oxygen storage components selected from the group consisting of cerium components and praseodymium components, the catalyst composition comprising:
      a support; and
      a palladium component; and
      a downstream catalyst located downstream of and in communication with the close-coupled catalyst, the downstream catalyst comprising an oxygen storage component selected from the group consisting of cerium components and praseodymium components.

2. The article as recited in claim 1, wherein the close coupled catalyst composition further comprises at least one rare earth oxide selected from the group consisting of neodymium oxide and lanthanum oxide.

3. The article as recited in claim 1, wherein the close coupled catalyst composition further comprises neodymium oxide and lanthanum oxide.

4. The article as recited in claim 1, wherein the close coupled catalyst composition further comprises a zirconium oxide stabilizer.

5. The article as recited in claim 1, wherein the support comprises at least one compound selected from the group consisting of silica, alumina, titania, and zirconia compounds.

6. The article as recited in claim 5 wherein the support comprises at least one activated compound selected from the group consisting of alumina, silica, zirconia, silica-alumina, alumina-silicates, alumina-zirconia, and alumina-chromia.

7. The article as recited in claim 6 wherein the support comprises activated alumina.

8. The article as recited in claim 1, wherein the close coupled catalyst further comprises a close coupled catalyst carrier which supports the close coupled catalyst composition.

9. The article as recited in claim 8 wherein the carrier comprises a honeycomb carrier.

10. The article as recited in claim 9 wherein there is:
    from about 75 to about 300 g/ft$^3$ of the palladium component;
    from about 0.75 to about 2.0 g/in$^3$ of activated alumina support;
    from about 0.05 g/in$^3$ to about 0.4 g/in$^3$ of strontium oxide;
    from about 0.05 to about 0.2 g/in$^3$ of barium oxide;
    from about 0.025 to about 0.3 g/in$^3$ of lanthanum oxide;
    from about 0.025 to about 0.3 g/in$^3$ of neodymium oxide; and
    from about 0.05 to about 0.5 g/in$^3$ of zirconium oxide.

11. The article as recited in claim 1 further comprising a three way catalyst downstream and in communication with the close coupled catalyst.

12. The article as recited in claim 1 wherein the close coupled catalyst composition further comprises a zirconium oxide as a stabilizer.

13. The article as recited in claim 1 wherein the close coupled catalyst composition is thermally stable upon exposure to temperatures up to 920° C.

14. The article as recited in claim 1 wherein the close coupled catalyst composition is thermally stable upon exposure to temperatures up to 1100° C.

15. The article as recited in claim 1 wherein the close coupled catalyst composition is thermally stable upon exposure to temperatures up to at least 1100° C.

16. The article as recited in claim 1 wherein the close coupled catalyst composition further comprises at least one alkaline metal oxide selected from the group consisting of strontium oxide, calcium oxide and barium oxide.

17. The article as recited in claim 16 wherein the alkaline metal oxide is strontium oxide.

18. The article as recited in claim 1 wherein the close coupled catalyst composition further comprises at least one platinum group metal component selected from platinum, rhodium, ruthenium, and iridium components.

19. The article as recited in claim 18 wherein there is:
    from about 0.50 to about 3.5 g./in$^3$ of activated alumina support;
    at least about 50.0 g/ft$^3$ of the palladium component; and
    from about 0.05 to about 0.5 g/in$^3$ of at least one alkaline earth metal component.

20. The article as recited in claim 19 wherein there is:
    from about 0.05 g/in$^3$ to about 0.4 g/in$^3$ of strontium oxide;
    from about 0.0 to about 0.5 g/in$^3$ of the second zirconium oxide; and
    from about 0.0 to about 0.5 g/in$^3$ of at least one rare earth metal oxide selected from the group consisting of lanthanum oxide and neodymium oxide.

21. The article as recited in claim 19 wherein there is:
    up to about 20.0 g/ft$^3$ of a rhodium component.

22. The article as recited in claim 19 wherein there is:
    up to about 60.0 g/ft$^3$ of a platinum component.

23. The article as recited in claim 19 wherein there is:
    from about 75 to about 300 g/f t$^3$ of the palladium component.

24. The article as recited in claim 1 further comprising a combined canister in which is located at least one of the close coupled catalyst and at least one downstream catalyst downstream of the close coupled catalyst.

25. The article as recited in claim 24 wherein the at least one downstream catalyst is a three way catalyst.

26. The article as recited in claim 24 wherein one downstream catalyst is adjacent to one close coupled catalyst.

27. The article as recited in claim 24 wherein the downstream catalyst is spaced apart from the close coupled catalyst.

28. The article as recited in claim 1 wherein the amount, based on weight per volume, of the at least one close coupled catalyst is less than the amount of the at least one downstream catalyst.

29. The article as recited in claim 28 wherein the relative amount of the at least one close coupled catalyst is from 1/20 to 1/2, based on weight per volume, of the amount of the at least one downstream catalyst.

30. The article as recited in claim 1 wherein the close coupled catalyst is located up to six inches from the exhaust outlet or exhaust manifold outlet.

31. The article as recited in claim 1 wherein the close coupled catalyst is connected directly to the exhaust outlet or exhaust manifold outlet.

* * * * *